United States Patent Office 3,434,702
Patented Mar. 25, 1969

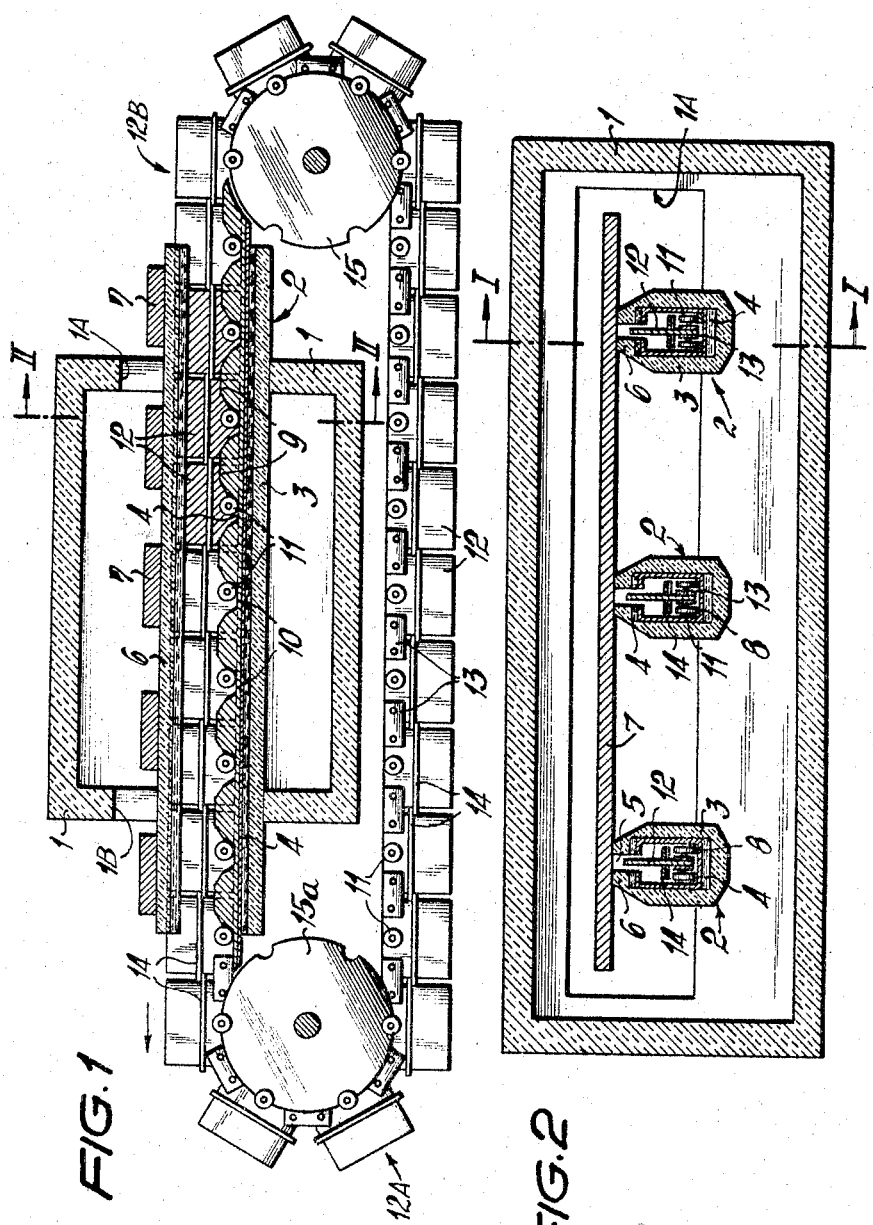

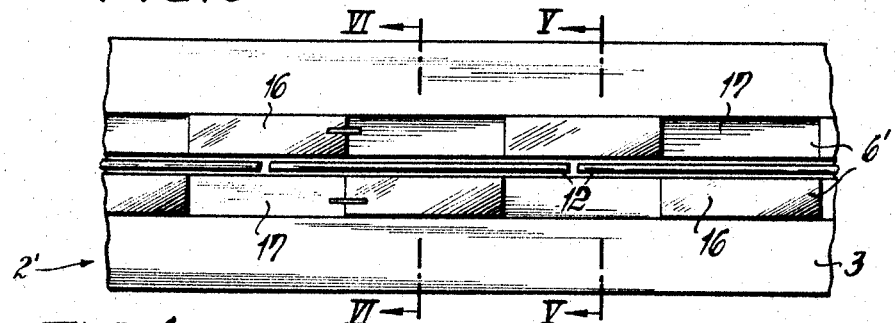
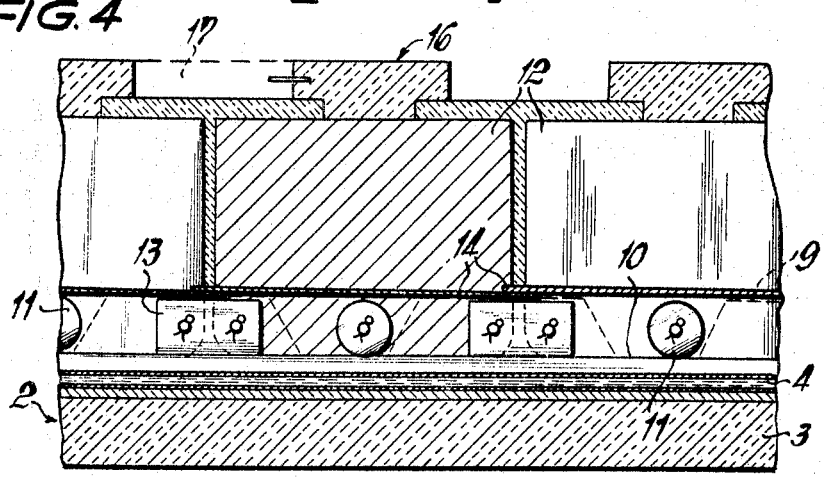
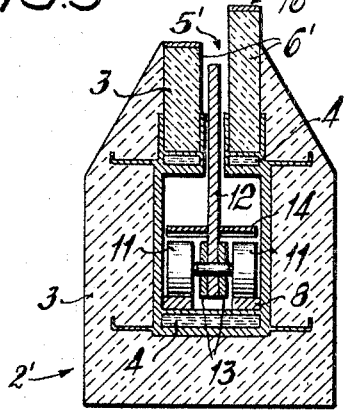
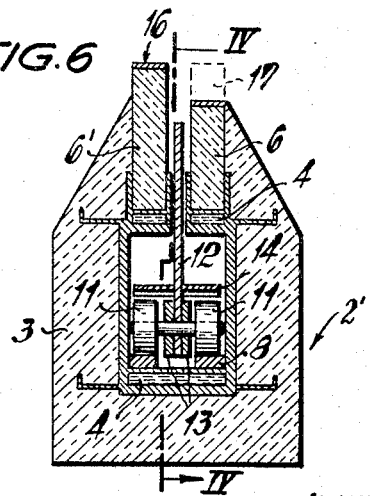

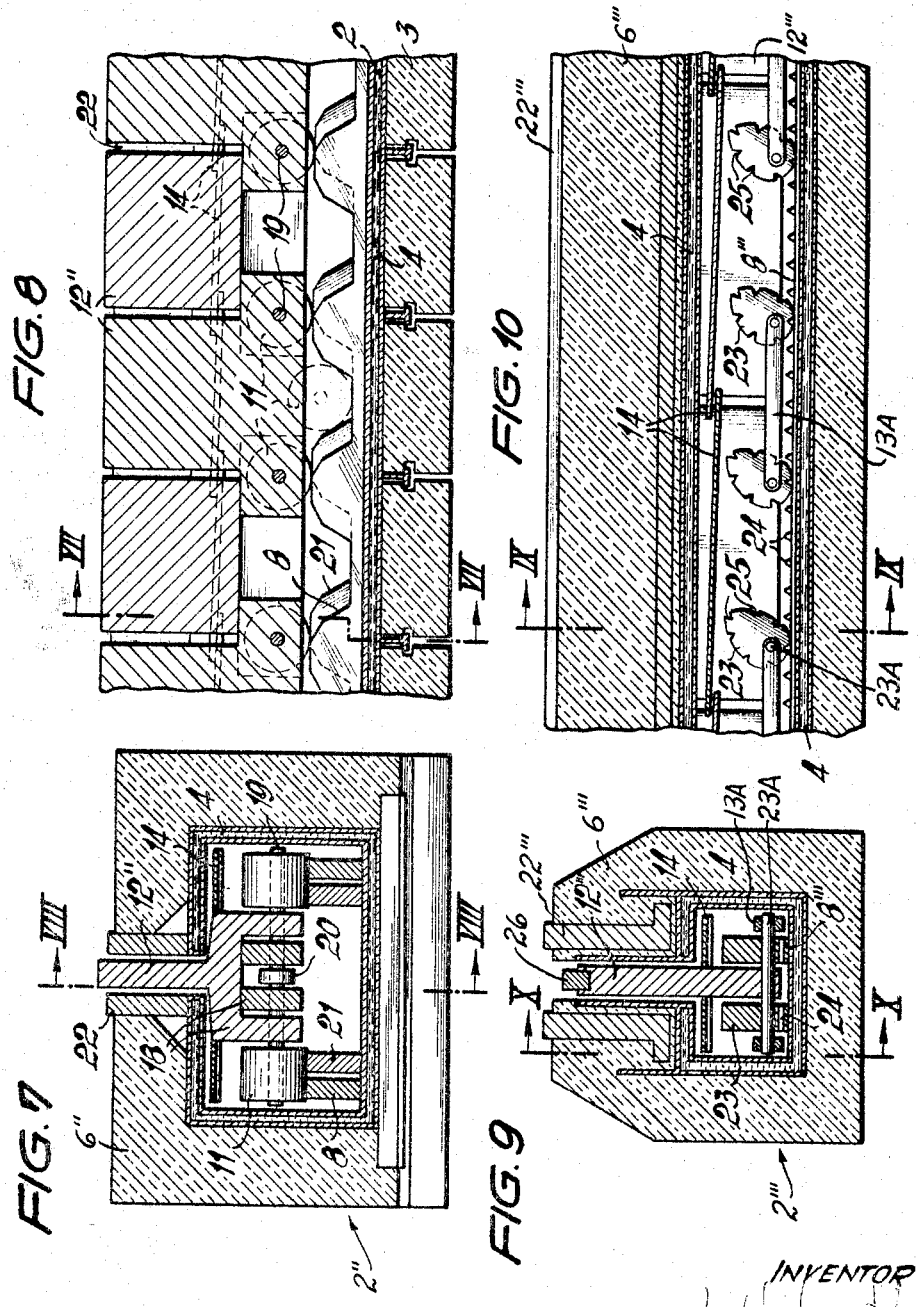

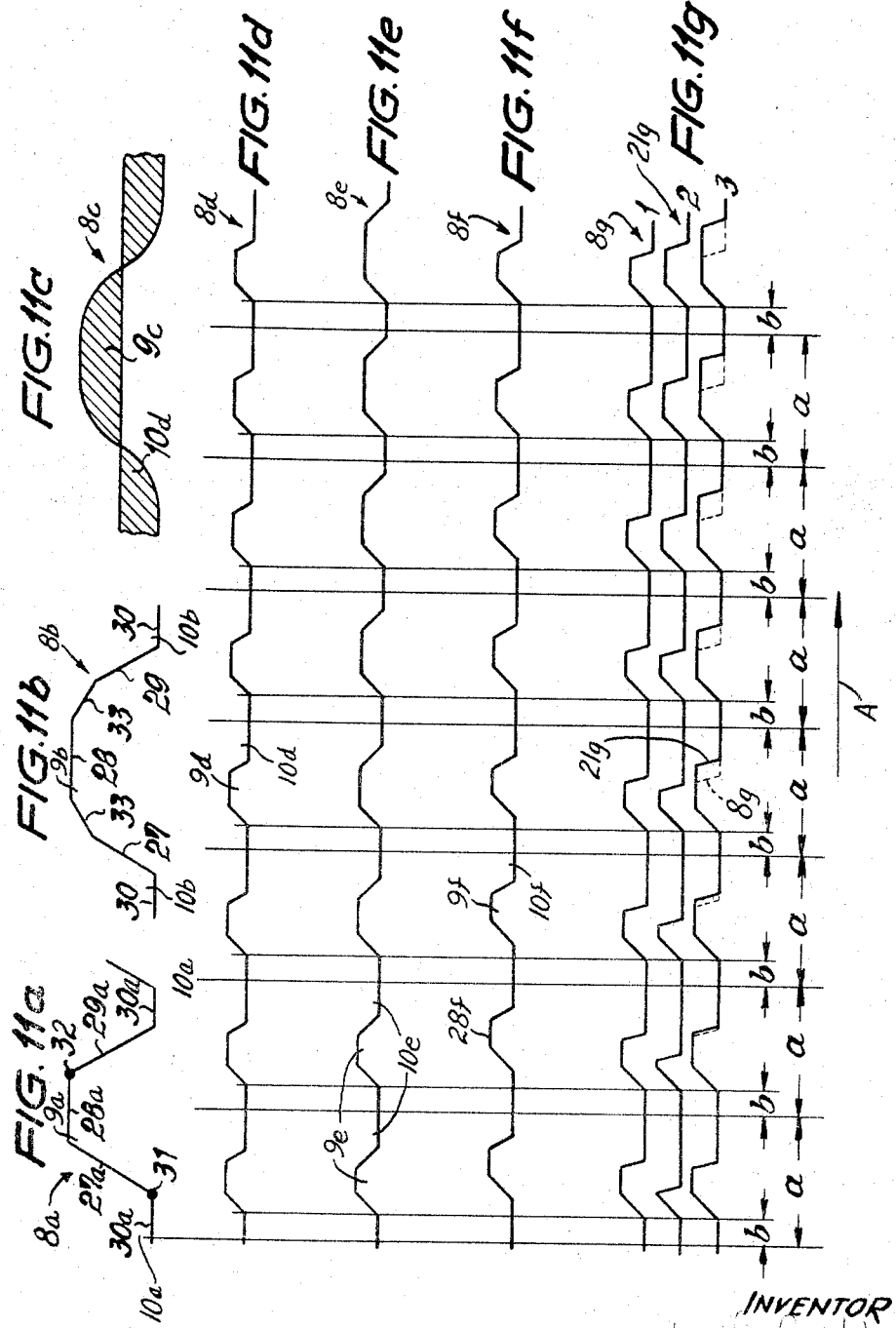

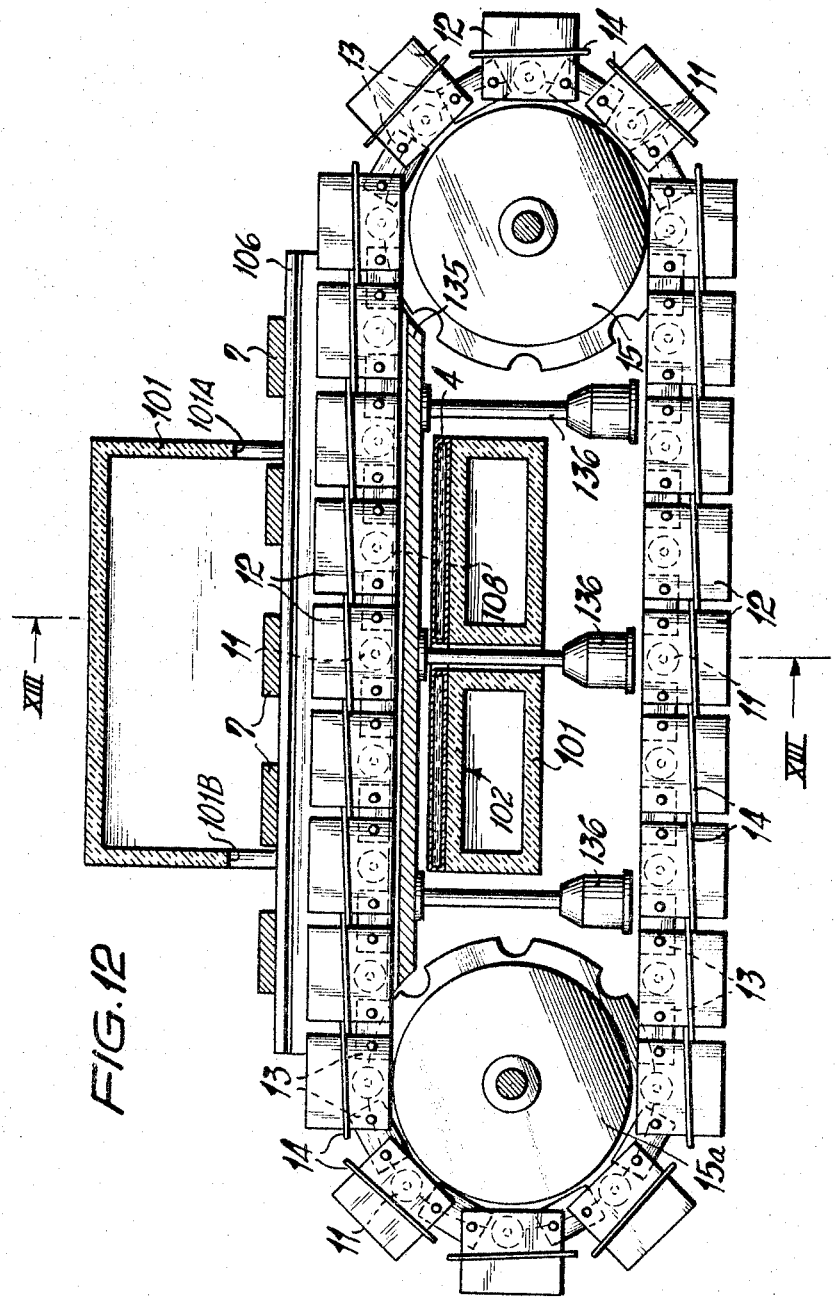

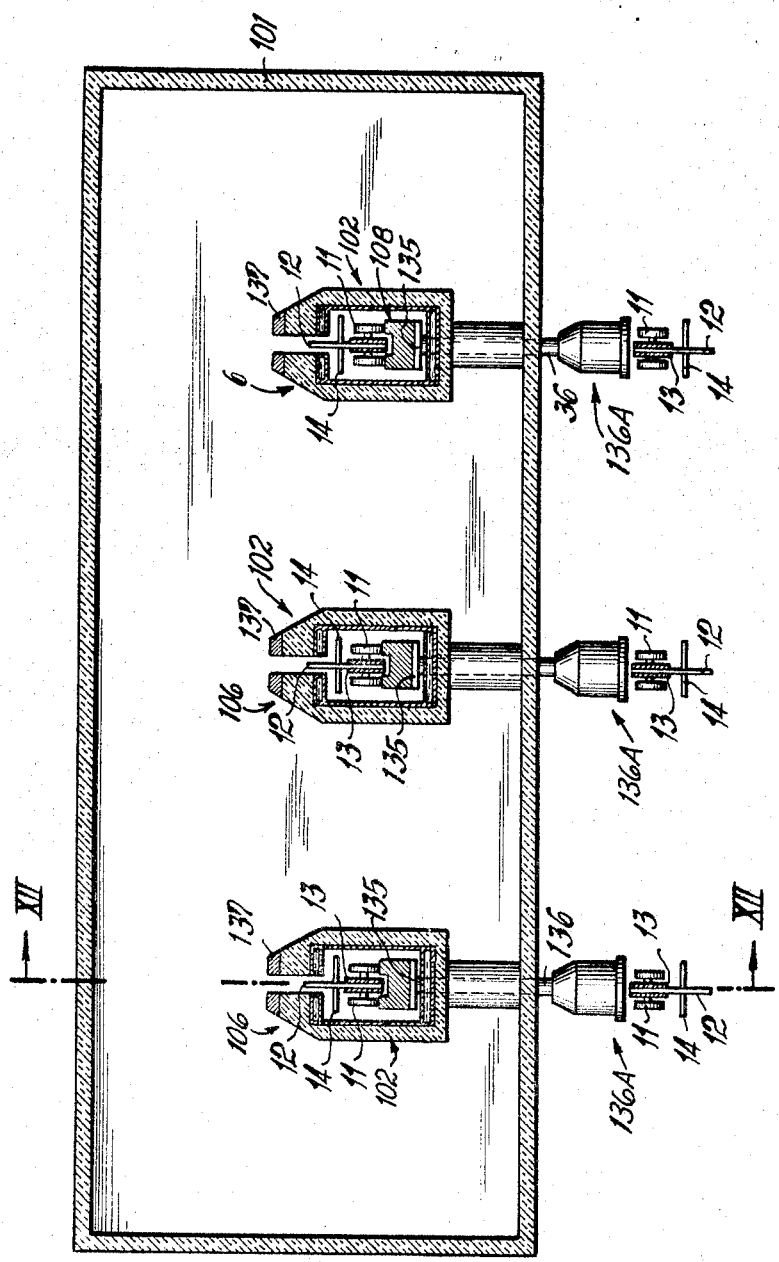

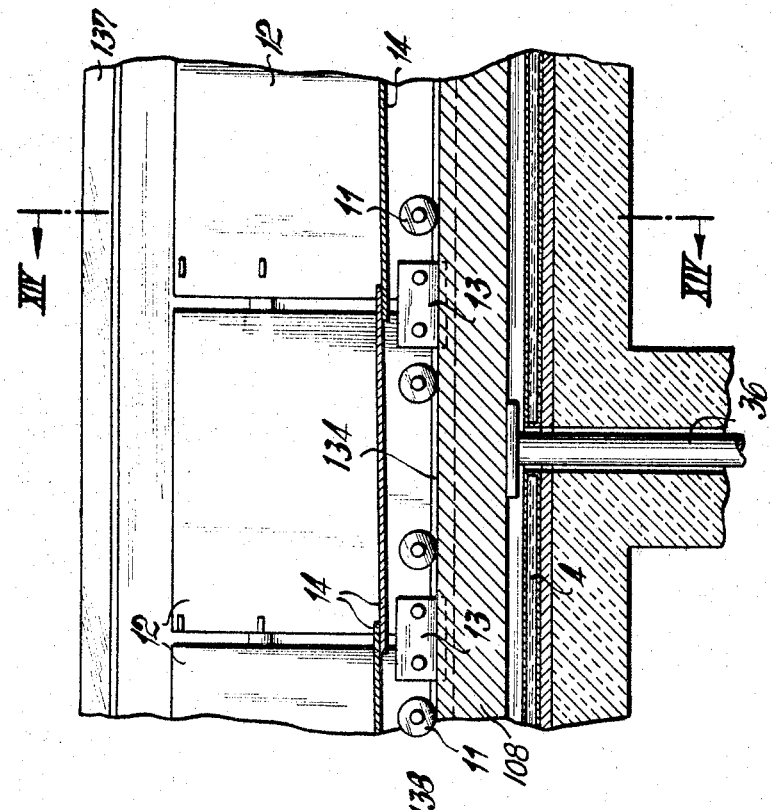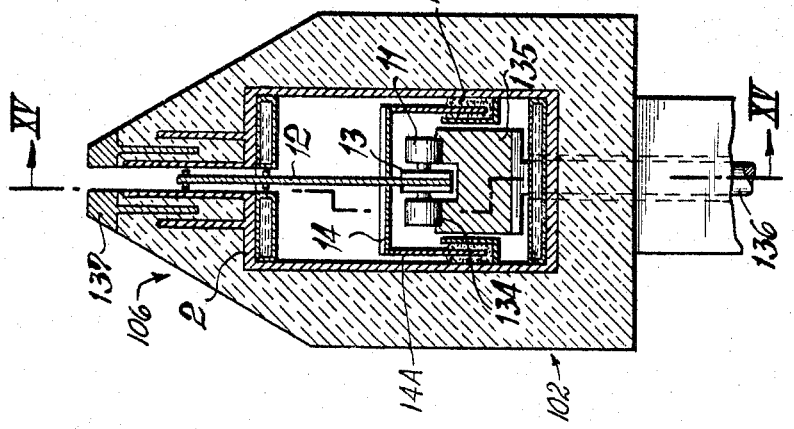

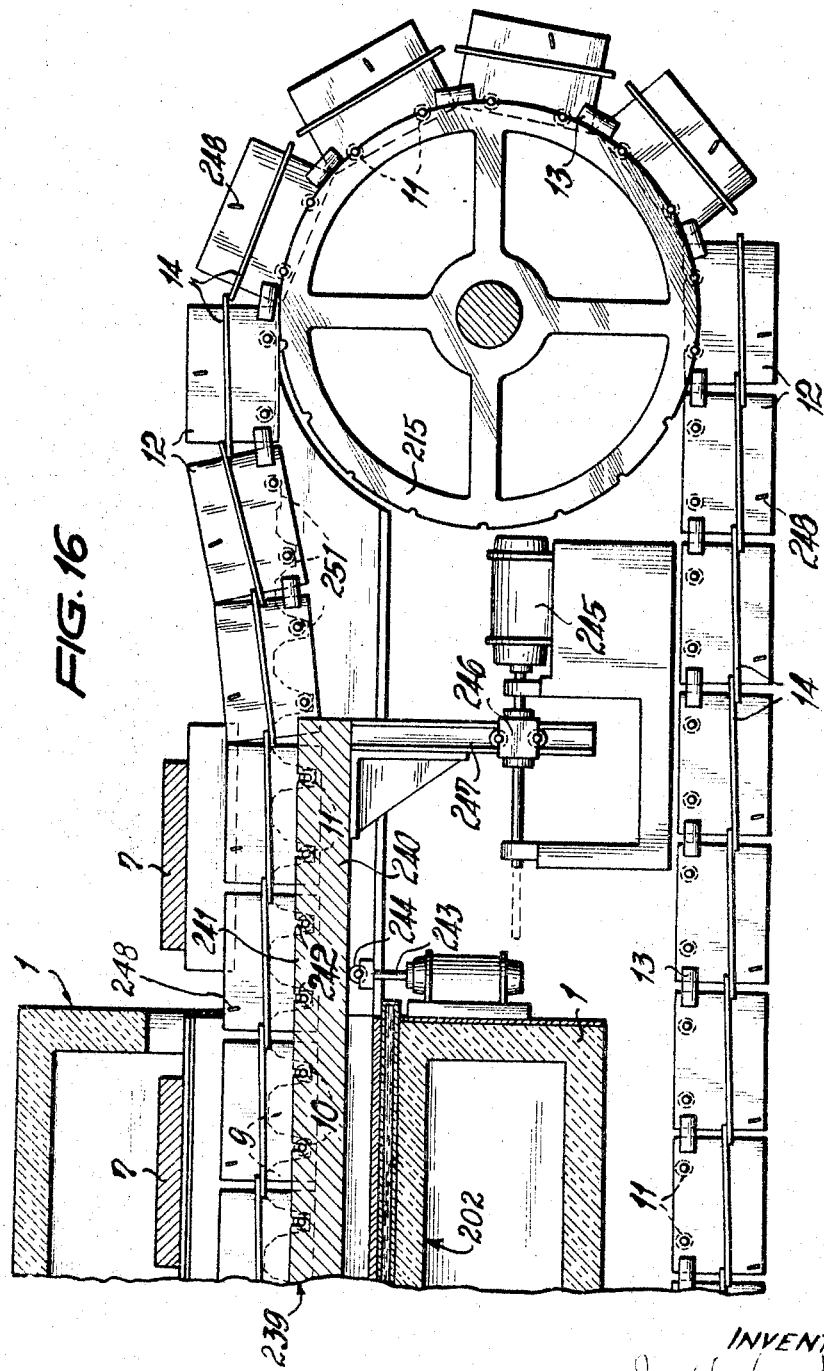

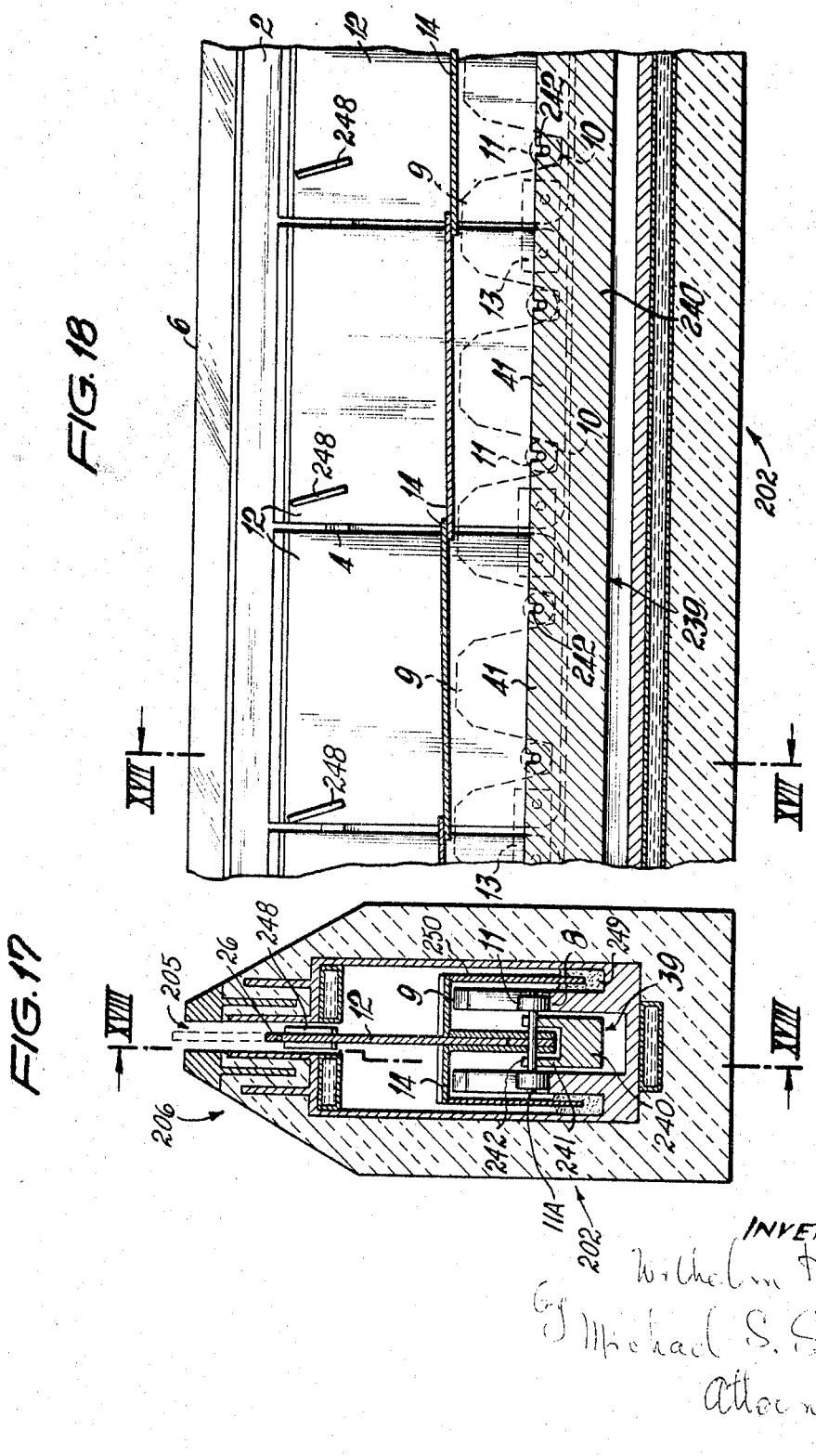

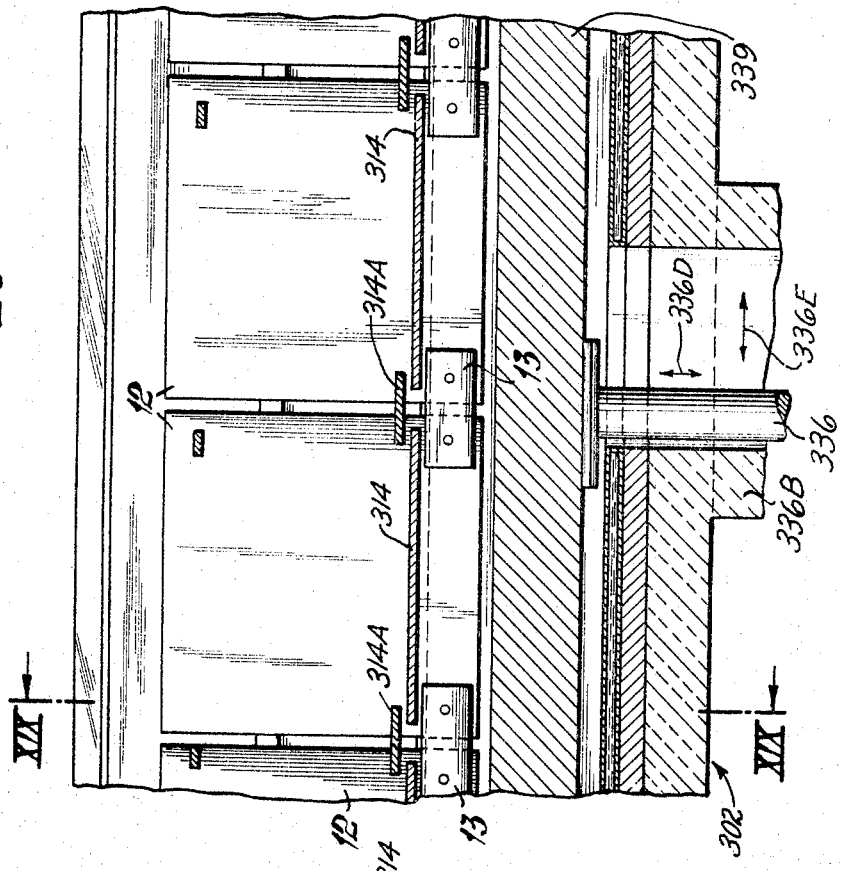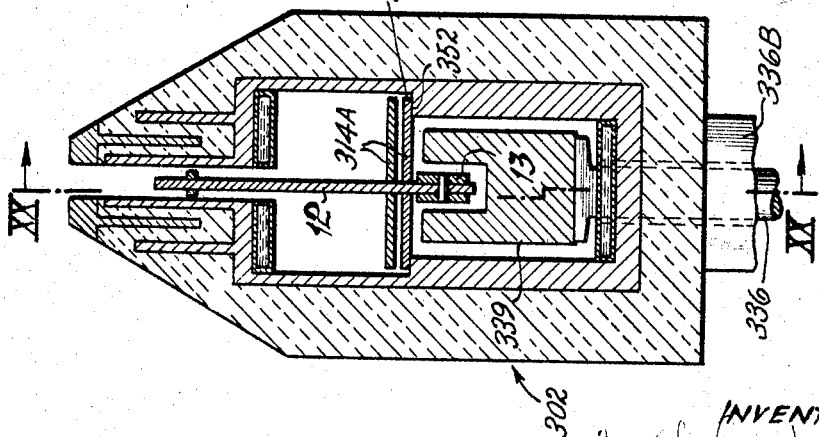

3,434,702
CONVEYOR FURNACE
Wilhelm Krause, Essen, Germany, assignor to Koppers-Wistra Ofenbau GmbH, Dusseldorf-Heerdt, Germany
Filed July 3, 1967, Ser. No. 651,051
Claims priority, application Germany, July 6, 1966, K 59,668; Oct. 12, 1966, K 60,442; Oct. 24, 1966, K 60,541
Int. Cl. F27b 9/24; F27d 3/12
U.S. Cl. 263—8
33 Claims

ABSTRACT OF THE DISCLOSURE

A metallurgical conveyor furnace wherein the upper stringers of several endless conveyors travel through a heating chamber and convey metallic workpieces in stepwise fashion. The conveyors comprise articulately connected links which move lengthwise as well as up and down while travelling along the upper stringers. Such links are movable into and extendable upwardly from cooling jackets mounted in the heating chamber so that the workpieces are lifted and advance with the links when the links along the upper stringers are raised and that the workpieces rest on the jackets when the links are retracted.

Background of the invention

The present invention relates to metallurgical furnaces in general, and more particularly to improvements in so-called conveyor furnaces which can transport metallic billets, ingots, slabs, rods, bars or other types of workpieces through a heating chamber.

In so-called walking beam furnaces, work-supporting beams are movable up and down as well as lengthwise in the interior of a heating chamber. The beams can be moved with reference to the chamber and serve to lift workpieces off the grate in the bottom region of the chamber, to transport the workpieces, and to redeposit the workpieces onto the grate. Such types of furnaces are employed when the workpieces should be heated substantially uniformly, not only from above but also from below, and they constitute an improvement over furnaces wherein the workpieces are transported along stationary rails so that those portions of workpieces which rest on the rails cannot be heated to the same temperature as the remaining portions. However, it was found that presently known walking beam furnaces are not satisfactory in heat-treatment of relatively thick metallic workpieces, particularly in annealing or analogous treatment of ingots, blocks or like bulky metallic bodies. This is attributed, in part, to the fact that workpieces which are transported through conventional walking beam furnaces cannot be heated from below with the same intensity as from above. In other words, presently known walking beam furnaces are so-called over firing furnaces. Unequal heating from above and below can cause dangerous thermal stresses, especially if the difference between the temperatures at the underside and at the upper side of a relatively thick metallic workpiece is rather large.

Another serious drawback of presently known furnaces is that the equipment required to collect and evacuate scale, slag or other matter which descends from workpieces in the heating chamber occupies too much room and that such equipment interfers with inflow of air into and with circulation or evacuation of gases from the heating chamber. Furthermore, the driving system which causes the beams to move with reference to the heating chamber is quite complicated and is exposed to heat so that it undergoes excessive wear.

Summary of the invention

It is an important object of the present invention to provide a metallurgical conveyor furnace which avoids the drawbacks of presently known walking beam furnaces and which can insure practically uniform heating of bulky metallic workpieces during travel through a heating chamber.

Another object of the invention is to provide a metallurgical conveyor furnace wherein the moving parts are subjected to lesser wear than in presently known conveyor furnaces, wherein the workpieces may be moved nearer to or further away from each other during travel through the heating chamber, which can be readily converted for heat-treatment of different types and sizes of metallic workpieces, which can maintain the workpieces in the heating chamber for desired intervals of time, and wherein the moving parts receive motion from drives which are shielded from heat in a space- and money-saving way.

A further object of the invention is to provide novel conveying, cooling, scale-collecting, slag removing and driving devices which can be employed in a conveyor furnace of the above outlined character.

An additional object of the instant invention is to provide a furnace wherein each and every portion of each workpiece can be heated from all sides during travel through the heating chamber.

Still another object of the invention is to provide a metallurgical furnace wherein the workpieces can be transported intermittently or continuously, at regular or irregular intervals, at greater or lesser speeds, closely adjacent to or at greater distances from each other, and wherein the workpieces may be heated in such a way that their temperature varies from region to region if such type of heat treatment is desired in connection with particular metallic materials or blanks.

A concomitant object of the present invention is to provide a metallurgical furnace wherein the workpieces can be heated from above and from below, and wherein the equipment necessary for conveying and supporting the workpieces in the heating chamber occupies relatively little room so that it cannot unduly interfere with flow of gases into, in the interior of and from the heating chamber.

Another object of the invention is to provide novel, compact and inexpensive heat insulating means for the conveyor of a metallurgical conveyor furnace.

A further object of the invention is to provide a novel method of evacuating scale and other foreign matter from the heating chamber of a metallurgical furnace.

Briefly outlined, the furnace of my invention comprises essentially a stationary heating chamber having an inlet and an outlet, at least one endless conveyor (preferably at least two conveyors) having an upper stringer extending through the heating chamber via the inlet and outlet and comprising a plurality of articulately connected preferably rectangular links of metallic sheet stock which transport metallic workpieces while moving along the upper stringer, a stationary cooling jacket surrounding the upper stringer of the conveyor and having at its top supporting means provided with a slot for the links of the conveyor, and drive means including first displacing means for moving the links in the heating chamber between raised positions in which the links extend beyond the slot and lift the workpieces above the jacket and lower positions in which the links are retracted into the jacket and the workpieces come to rest on the supporting means, and second displacing means for moving the links lengthwise whereby the links which are held in raised positions advance the workpieces through the heating chamber.

The first displacing means may comprise fixed and/or adjustable rails provided in the jacket and followers provided on the links to track uneven surfaces of the rails and to thereby move the links up and down. The second displacing means may comprise sprocket wheels or reciprocable pusher means for moving the links of the conveyor lengthwise during movement in one direction.

During travel along the upper stringer of the endless conveyor, the links preferably form a continuous or nearly continuous support so that they cannot fail to lift the workpieces when raised to their upper end positions in which they extend beyond the supporting means of the fixed jacket.

The novel features which are considered as characteristic of the invention are set forth in particular in the appended claims. The improved furnace itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a longitudinal sectional view of a first metallurgical furnace, substantially as seen in the direction of arrows from the line I—I of FIG. 2, showing one of three endless conveyors which transport workpieces through a heating chamber;

FIG. 2 is a fragmentary transverse sectional view as seen in the direction of arrows from the line II—II of FIG. 1;

FIG. 3 is a fragmentary top plan view of a modified cooling jacket which can replace the jackets shown in FIGS. 1 and 2;

FIG. 4 is a longitudinal vertical sectional view of the jacket shown in FIG. 3, substantially as seen in the direction of arrows from the line IV—IV of FIG. 6;

FIG. 5 is a transverse vertical sectional view as seen in the direction of arrows from the line V—V of FIG. 3;

FIG. 6 is a transverse vertical sectional view as seen in the direction of arrows from the line VI—VI of FIG. 3;

FIG. 7 is a transverse vertical sectional view of a third cooling jacket wherein the links of the endless conveyor are moved lengthwise by a pusher, the section being taken in the direction of arrows from the line VII—VII of FIG. 8;

FIG. 8 is a fragmentary longitudinal sectional view as seen in the direction of arrows from the line VIII—VIII of FIG. 7;

FIG. 9 is a transverse vertical sectional view of a fourth cooling jacket, substantially as seen in the direction of arrows from the line IX—IX of FIG. 10;

FIG. 10 is a fragmentary longitudinal sectional view as seen in the direction of arrows from the line X—X of FIG. 9;

FIG. 11a is a fragmentary side elevational view of a toothed rail which can be utilized in jackets of the type shown in FIGS. 1–8;

FIG. 11b is a similar view of a modified rail;

FIG. 11c is a similar view of a third rail;

FIG. 11d is a diagrammatic side elevational view of a fourth rail;

FIG. 11e is a similar view of a fifth rail whose teeth are similar to those of the rail shown in FIG. 11a;

FIG. 11f is a similar view of a sixth rail;

FIG. 11g illustrates rails which can be utilized in jackets of the type shown in FIGS. 7 and 8;

FIG. 12 is a longitudinal sectional view of a metallurgical furnace which constitutes a modification of the furnace utilizing cooling jackets and conveyors of the type shown in FIGS. 7 and 8, the section being taken in the direction of arrows from the line XII—XII of FIG. 13;

FIG. 13 is a transverse vertical sectional view as seen in the direction of arrows from the line XIII—XIII of FIG. 12;

FIG. 14 is a larger-scale transverse vertical sectional view of one of the cooling jackets shown in FIG. 13, substantially as seen in the direction of arrows from the line XIV—XIV of FIG. 15;

FIG. 15 is a fragmentary longitudinal sectional view as seen in the direction of arrows from the line XV—XV of FIG. 14;

FIG. 16 is a fragmentary longitudinal vertical sectional view of a further metallurgical furnace which constitutes a modification of the furnace shown in FIG. 12;

FIG. 17 is a larger-scale transverse vertical sectional view of a cooling jacket in the furnace of FIG. 16, the section being taken in the direction of arrows as seen from the line XVII—XVII of FIG. 18;

FIG. 18 is a longitudinal vertical sectional view as seen in the direction of arrows from the line XVIII—XVIII of FIG. 17;

FIG. 19 is a transverse vertical sectional view of a further cooling jacket which can replace cooling jackets of the type shown in FIG. 16, the section being taken in the direction of arrows from the line XIX—XIX of FIG. 20; and FIG. 20 is a fragmentary longitudinal sectional view as seen in the direction of arrows from the line XX—XX of FIG. 19.

Description of the preferred embodiments

Referring first to FIGS. 1 and 2, there is shown a metallurgical furnace of the type known as conveyor furnace. It comprises a stationary heating chamber 1 having two opposed upright side walls which are respectively provided with an inlet 1A and an outlet 1B, both located substantially midway between the top and bottom walls of the heating chamber. A system of three endless conveyors 12A serves to advance metallic workpieces 7 through the chamber 1 in such a way that the workpieces can be readily heated from above as well as from below. Each conveyor 12A comprises a substantially horizontal upper stringer 12B which extends through the inlet 1A, the interior of the chamber 1, and the outlet 1B. The lower stringer of each conveyor 12A is located without and at a level below the chamber 1. The conveyors 12A are assembled of articulately coupled links 12 of metallic sheet stock which resemble rectangular plates and together form a continuous or nearly continuous support while advancing through the chamber 1 along the upper stringers 12B so that their top edges may engage and transport the workpieces 7. Pairs of sprocket wheels 15, 15a are respectively mounted outwardly of the inlet 1A and outlet 1B, and each conveyor 12A is trained around one pair of such sprocket wheels so that its upper stringer 12B is substantially horizontal.

In accordance with a feature of my invention, the furnace further comprises an elongated stationary cooling jacket 2 for each of the conveyors 12A, and each of these jackets extends through the interior of the heating chamber 1. As shown in FIG. 1, the ends of the jackets 2 actually extend beyond the inlet 1A and outlet 1B. Each jacket 2 is provided with a housing or shell 3 of heat-insulating material which surrounds a cooling unit 4. The top portion 6 of each jacket 2 constitutes a stationary supporting means for workpieces 7 and is formed with an elongated slot 5 which is located in a vertical plane and permits upward and downward movements of the links 12. The width of the slot 5 exceeds only slightly the thickness of links 12 so as to reduce the likelihood of penetration of foreign matter into the interior of the respective jacket. Each such jacket 2 is provided with an internal compartment which extends all the way between the longitudinal ends of the jacket and communicates with the respective slot 5. The top portion 6 of each jacket 2 has supporting surfaces at both sides of the respective slot 5, and such surfaces intercept the workpieces 7 when the links 12 are caused to move downwardly so as to be fully accommodated in the respective jackets.

The drive means for the conveyors 12A comprises two displacing units including a first displacing unit which is accommodated in the compartments of the jackets 2 and a second displacing unit which includes the aforementioned sprocket wheels 15, 15a. The first displacing unit includes fixed rails 8 which are installed in the jackets 2 and have projections in the form of cams or teeth 9 alternating with recesses or tooth spaces 10. This first displacing unit further includes roller followers 11 mounted on the links 12 and serving to track the respective rails 8 whereby the links 12 move between raised positions in which they extend upwardly and beyond the top portions 6 to lift the workpieces 7 above the jackets 2 and lower or retracted positions in which they are fully accommodated in the jackets 2 so that the workpieces 7 come to rest on the top portions 6. The links 12 are connected to each other by means of small plates 13 each of which is pivoted to a pair of adjoining links. The plates 13 alternate with the followers 11. Each link 12 further carries an intercepting member or baffle 14 which resembles a horizontal plate and is installed in the internal compartment of the respective jacket 2 at such a level that it does not interfere with vertical movements of the respective link. The purpose of the baffles 14 is to intercept scale which descends from workpieces 7 during travel in the chamber 1 so that such scale cannot reach the rails 8. Furthermore, the baffles 14 carry the scale lengthwise of the jackets 2 and dump the accumulated material during travel around the sprocket 15a. In other words, all foreign matter is evacuated automatically when the conveyors 12A are in motion. FIG. 1 shows that the ends of adjoining baffles 14 overlap.

The second displacing unit of the drive means for the conveyors 12A includes the sprocket wheels 15 and/or 15a which engage with the followers 11. At least one of these wheels can be rotated intermittently or uninterruptedly.

The operation is as follows:

Workpieces 7 are loaded onto the top edges of links 12 or onto the top portions 6 of the jackets 2 in the region above the upper stringers 12B and to the right of the inlet 1A. The sprocket wheels 15 and/or 15a are driven to advance the conveyors 12A lengthwise whereby the links 12 entrain the workpieces 7 and advance them stepwise through the heating chamber 1. When the follower 11 of a link 12 travels along a tooth 9, the top edge of such link extends beyond the respective slot 5 and the link lifts the adjoining workpiece 7 above the top portion 6 of the corresponding jacket 2. The workpiece 7 then shares the movement of link 12 along the respective upper stringer 12B. When a roller follower 11 enters a tooth space 10, the respective link 12 is fully concealed in its jacket 2 and the workpiece 7 rests on the top portion 6 so that the thus retracted link can advance beyond the workpiece. However, the latter is lifted again by one or more next-following links 12.

The jackets 2 occupy relatively little room in the heating chamber 1 so that there remains ample space for heating of workpieces from above as well as from below and for entry, circulation and evacuation of gases from the heating chamber. The workpieces 7 are removed after they issue from the outlet 1B. These workpieces may be constituted by billets, ingots, slabs, bars or like metallic bodies. They may but need not extend across all three jackets 2.

If the rails 8 are inverted so that their cams or teeth 9 face downwardly, the furnace of FIGS. 1 and 2 can be used in heat-treatment of certain workpieces which need not be subjected to uniform heating action. The workpieces then remain in continuous contact with the top edges of those links 12 which travel along the upper stringers 12B. The speed at which the workpieces will advance between the inlet 1A and outlet 1B will depend on the speed at which the sprocket wheels 15 and/or 15a are driven.

Such portions of the drive means for the links 12 which are accommodated in the compartments of the jackets 2 are protected from heat as well as from foreign matter.

As stated before, the drive means include first displacing units (including the rails 8 and followers 11) which move the links 12 along the stringers 12B up and down, and second displacing units (wheels 15 and/or 15a) which move the links 12 lengthwise so that the links along the stringers 12B travel toward and beyond the inlet 1A, through the interior of the chamber 1, and through and beyond the outlet 1B. The direction of travel of the conveyors 12A can be reversed.

Since the jackets 2 accommodate all such parts of the drive means which are located in the interior of the heating chamber 1, and since the jackets occupy very little room in this chamber (see FIG. 2), there remains ample space for over firing and under firing equipment as well as for circulation of air and hot gases. The jackets 2 provide protection against excessive heating of conveyors 12A (i.e., of the links 12 along the upper stringers 12B) as well as against excessive heating of certain parts of the drive means. The manner in which the interior of the chamber 1 is maintained at a desired temperature forms no part of my invention.

If the distance between the axes of pairwise arranged followers 11 is the same, if the rails 8 are stationary, if each rail 8 is provided with equidistant tooth spaces 10 and identically configurated teeth 9, and if each follower 11 can enter each space 10 of the respective rail 8, the links 12 along the upper stringers 12B will move up and down at the same time and to the same extent so that all of the workpieces 7 will simultaneously rise above or descend onto the jackets 2.

An advantage of the just described mode of assembling and operating the drive means for the conveyors 12A is that the load upon the jackets 2 remains unchanged, regardless of whether the workpieces are supported by the links 12 or by the top portions 6.

FIGS. 3 to 6 illustrate certain details of a slightly modified metallurgical furnace. The cooling jackets 2' (only one shown) are provided with interrupted top portions 6' wherein rectangular protuberances or hills 16 alternate with valleys or gaps 17. The arrangement is such that the hills 16 at one side of each slot 5' register with valleys 17 at the other side of the same slot and that each hill 16 of one jacket 2' registers with a hill 16 of the adjoining jacket 2'. Such configuration of jackets 2' insures that the area of contact between their top portions 6' and the undersides of workpieces (not shown in FIGS. 3–6) is reduced to a minimum, i.e., that the underside of each workpiece can be heated substantially along its full length and width. Such intensive heating from below is further enhanced due to staggering of hills 16 at the opposite sides of each slot 6'.

Otherwise, the construction of the furnace embodying the structure of FIGS. 3–6 is identical to that of the previously described furnace and its parts are denoted by similar reference characters.

FIGS. 7 and 8 illustrate portions of a third furnace wherein the links 12" are provided with bifurcated portions 18. The bifurcated portions 18 of adjoining links are interdigitated in a manner as shown in FIG. 7 and are hingedly connected to each other by horizontal pivots 19 which carry the followers 11. The connecting plates 13 are omitted. A pusher 20 is disposed between the prongs of bifurcated portions 18. This pusher forms part of the second displacing unit and moves the links 12" lengthwise when it performs a working stroke but it allows the links 12" to dwell while performing a return stroke.

The followers 11 at each side of the line of links 12" track two composite rails each of which includes a fixedly mounted rail 8 and a longitudinally adjustable companion rail 21. By moving the rail 21 of each pair into partial or full registry with the associated rail 8, the operators can change the effective length of teeth and tooth spaces to thus select the rate at which the workpieces are conveyed through the heating chamber.

The top portion 6″ of the jacket 2″ shown in FIGS. 7 and 8 has embedded therein inserts 22 of metallic material which prevent direct contact between the workpieces and the heat-insulating material of the jacket. These inserts 22 are firmly anchored in the housing of the jacket 2″. When the workpieces are lowered and come to rest on the inserts 22, these inserts transmit the weight of the workpieces to the housing of the jacket 2″ but prevent excessive heat exchange between such portions of the workpieces which overlie the jacket and the top portion 6″.

FIGS. 9 and 10 show a portion of a fourth furnace wherein the links 12‴ are provided with pairs of non-circular followers 23 serving to track rails 8‴. Each follower 23 is of elliptical outline and is provided with notches 25 serving to accommodate projections 24 of the respective rails 8‴. The connections between adjoining links 12‴ comprise rods or bars 13A whose ends are mounted on the shafts 23A of followers 23 in a manner as shown in FIG. 10. The projections 24 insure that all of the followers 23 roll along the rails 8‴ at the same speed.

The top portions of the links 12‴ carry heat insulating members 26 which come into actual contact with the undersides of workpieces when the links 12‴ are raised by their followers 23. These followers 23 and the rails 8‴ constitute the first displacing unit for the links 12‴. The top portion 6‴ of the cooling jacket 2‴ shown in FIGS. 9 and 10 is provided with inserts 22‴ which are anchored in the housing of the jacket and have L-shaped profiles. The inserts 22‴ consist of metallic material and support the workpieces when the links 12‴ are fully retracted into the jacket 2‴.

Each link 2‴ carries two pairs of followers 23 and each of these links carries a baffle 14 which intercepts scale penetrating through the slot in the top portion 6‴ of the jacket 2‴. The ends of adjoining baffles 14 overlap (see FIG. 10).

Since the major portion of each link 12‴ is retracted at all times, the links are cooler than the workpieces. The members 26 prevent localized overcooling of workpieces when the links are raised so that their top portions extend beyond the inserts 22‴. In order to prevent direct contact between the heat-insulating material and the workpieces, the top face of each member 26 can be armored with a sheet of steel or other wear-resistant material.

The top portion 6‴ of the jacket 2‴ can be assembled of heat-resistant bricks and the inserts 22‴ may consist of steel rails or the like. As described in connection with FIGS. 3–6, the top portion of each jacket can be formed with alternating hills (16) and valleys (17) to reduce the area of contact with hot workpieces. Such hills and valleys can be provided in the inserts 22‴. The valleys will permit flow of hot gases. As the workpieces travel through the heating chamber, different portions of their undersides are alternately exposed and engaged by the inserts 22‴ (if such inserts are provided with hills and valleys) so that the entire underside of each workpiece is heated substantially to the same temperature.

FIGS. 11a to 11g illustrate several types of rails for the followers of links shown in FIGS. 1 to 8. As shown in FIG. 11c, each unit-length section of a rail 8c can include a tooth 9c and a tooth space 10c which are respectively bounded by a smooth convex and a smooth concave surface. FIG. 11b shows that each tooth 10b of a modified rail 8b may comprise several facets including a steeply inclined first lifting facet 27, a less inclined second lifting facet 33, a horizontal top facet 28, a downwardly inclined first lowering facet 33a and a steeper second lowering facet 29. The facets 30 bounding the tooth spaces 9b are horizontal. The facets 33 insure gradual transition between the facets 27, 28 and 28, 29.

FIG. 11a shows a portion of a simplified rail 8a wherein each tooth 9a comprises a single lifting facet 27a, a top facet 28a and a single lowering facet 29a. The sharply defined lines of transition between the facets 30a, 27a and 28a, 29a are shown at 31 and 32. The facets 30a of FIG. 11a bound the tooth spaces 10a.

The followers 11 (not shown in FIGS. 11a and 11b) will track the facets 33 of FIG. 11b when the corresponding links respectively lift and lower the workpieces away from and onto the supporting means of the jackets. The rails 8b, 8c are normally preferred over the rail 8a shown in FIG. 11a because the conveyor cooperating with rails having smooth-surfaced or multifaceted teeth will be subjected to lesser tensional stresses. In this respect, the rail 8c shown in FIG. 11c will be preferred in most instances because the followers 11 can roll along smooth surfaces with gradual transitions between upwardly and downwardly slanting sections of such surfaces.

If the distance between the lifting and/or lowering facets of teeth on a rail is altered, the workpieces advancing through the heating chamber can be moved nearer to or further away from each other. For example, if the transition lines 32 on successive teeth 9a of the type shown in FIG. 11a are not equidistant from each other, i.e., if the distance between such lines decreases in the direction of travel of the links, the distance between successive workpieces will increase. In other words, if the length of the top facets 28a on successive teeth 9a increases at the expense of the width of tooth spaces 10a, the periods during which the workpieces are lifted off the jackets become longer and the workpieces are moved apart. Lengthening of top facets 28a will result in shortening of facets 30a in the spaces 10a between successive teeth 9a. This is shown in FIG. 11e wherein the width of successive tooth spaces 10e between the teeth 9e of a rail 8e decreases in the direction of travel of the links (arrow A).

Excessive stressing of conveyors during lifting of workpieces off the supporting means of jackets can be prevented by utilizing rails 8f of the type shown in FIG. 11f. This rail 8f comprises teeth 9f alternating with tooth spaces 10f and the combined length of a tooth 9f plus the width of the next-following space 10f is always the same but less than the distance a between the axes of successive followers 11. Such construction insures that the workpieces are lifted sequentially, i.e., one after the other. The top facets 28f of teeth 9f are of identical length.

FIG. 11d shows a portion of a rail 8d with identically dimensioned teeth 9d and tooth spaces 10d. The length of a tooth 9d plus the width of the adjoining space 10d is always the same and equals the distance a between the axes of successive followers 11. The characters b denote the periods during which the links dwell in their lower end positions. Rails of the type shown in FIG. 11d will cause the links to lift all of the workpieces at the same time.

FIG. 11g shows a composite rail of the type described in connection with FIGS. 7 and 8. The rail 8g is firmly secured to the respective jacket but the other rail 21g is adjustable lengthwise of the fixed rail 8g so that its teeth and tooth spaces can be moved into partial or full registry with the teeth and tooth spaces of the fixed rail 8g. The fixed rail 8g is represented by the top curve of FIG. 11g. The median curve indicates the outline of the adjustable rail 21g which is similar to the rail 8e shown in FIG. 11e in that the length of top facets on its teeth increases in the direction indicated by the arrow A. The lowermost curve of FIG. 11g indicates the outline of a composite rail including the rails 8g, 21g while the rail 21 is being held in one of a series of positions. The combined length of successive pairs of transversely aligned teeth on the rails 8g, 21g increases in the direction of travel of the links. The rail 8g or 21g can be removed, i.e., each of these rails can be used alone or together with the other rail.

Referring now to FIGS. 12 to 15, there is shown a further metallurgical furnace with a heating chamber 101 provided with an inlet 101A and outlet 101B. In this embodiment of my invention, the jackets 102 accommodate vertically reciprocable rails 108 having top surfaces 134 which are tracked by the followers 11 of links 12. The links 12 are coupled to each other by plates 13 in the same way as described in connection with FIGS. 1–2 and carry baffles 14. The rails 108 are integral or rigid with bases or platforms 135 which can be moved up and down by displacing devices including vertically reciprocable rods 136. Some of these rods 136 extend through the bottom wall of the heating chamber 101 and each such rod receives motion from a vertically movable driving member 136A. The members 136A are driven in synchronism so that they lift the rails 108 in each of the jackets 102 at the same time. The top portions 106 of the jackets 102 carry inserts 137 which support the workpieces when the rails 108 are free to descend so that the links 12 are fully retracted into the respective jackets. The internal compartment of each jacket 102 accommodates two longitudinally extending sand traps 138 which prevent penetration of scale and/or slag into contact with the rods 136. The baffles 14 carry skirts 14A whose lower edge portions are permanently received in the respective traps 138.

The drive of FIGS. 12 to 15 will be employed when the workpieces 7 must be transported at a high speed. The wheel 15 and/or 15a can be driven continuously and the workpieces 7 will rise and descend at the rate depending on the frequency of upward and downward movements of the rods 136. It is clear that the median rod 136 of FIG. 12 could be omitted or that each displacing device could extend through the lower part of the heating chamber 101.

FIGS. 16 to 18 illustrate a furnace which is similar to the furnace of FIGS. 7 and 8. A pusher is shown at 239 and this pusher comprises an elongated horizontal beam 240 provided with transverse ribs 241. The ribs 241 are separated by transversely extending channels 242 which can receive the shafts 11A of the followers 11. The pushers 239 can be raised and lowered by jacks 243 whose piston rods are provided with rolls 244. When a beam 240 is lifted by two or more jacks 243, it can travel along the rolls 244 in response to motion received from a hydraulic cylinder and piston assembly 245. The arrangement is such that the pushers 239 can move back and forth regardless of whether they are maintained in fully or partly raised positions or in lower end positions. The piston rod of the assembly 245 carries a slide 246 which can travel in a vertical guide channel 247 affixed to the associated beam 240. Thus, when the piston rod of the jack 243 shown in FIG. 16 performs an upward stroke and its roll 244 raises the beam 240, the latter moves with the guide channel 247 which can transmit lengthwise movement to the beam 240 in response to retraction or expulsion of the piston rod (slide 246) in the assembly 245.

The slot 205 in the top portion 206 of the cooling jacket 202 shown in FIG. 17 accommodates cutting or material removing devices 248 which serve to clean the slot 205 by cutting away scale, slag or the like. The cutting devices 248 are mounted on the links 12 and are staggered transversely of the direction of travel of the links (see particularly FIG. 18). The width of the slot 205 must suffice to permit movement of links 12 even if the slot is partially clogged by inflowing slag which hardens on exchange of heat with the jacket 202. The cutting devices 248 can be permanently, adjustably or removably attached to both sides of each link 12 and are distributed in such a way that each thereof cleans a certain region of the slot 205. Thus, the topmost cleaning device or devices 248 will remove a relatively thin strip of hardened slag during travel through the slot 205. The cleaning devices 248 at a level directly below such topmost cleaning devices will remove a thin strip from the layer of slag which remains in the slot 205, and so forth, so that the slot is relieved of hardened foreign matter at least once in response to each complete revolution of the conveyor which includes the links 12. The number of cleaning devices can be selected as a function of the ratio of the height of the slot 205 to the length of vertical strokes of the links 12. This number is preferably selected in such a way that each cutting device 248 must remove a relatively thin strip of foreign material in the slot 205 and that the path of a succeeding cutting device overlaps the path of the preceding cutting device in order to make absolutely sure that all foreign matter is removed without undue stressing of the cutting edges. The thus removed material can be transported by the cutting devices 248 to be discarded at the end turn of the conveyor or is allowed to descend onto the baffles 14 which transport it through and beyond the internal compartment of the jacket 202.

The internal compartment of the jacket 202 accommodates two longitudinally extending water-containing traps 249 for the lower edges of shields 250 carried by the baffles 14. The shields 250 travel downwardly along ways 251 provided adjacent to the intake end of the jacket 202 and upwardly along similar ways at the discharge end of the jacket so that their lower edges dip into the traps 249 during travel along the upper stringer of the respective endless conveyor.

The pusher 239 and the assemblies 243, 245 replace the drive for one of the wheels 15. Thus, the links 12 are raised and lowered in the same way as described in connection with FIGS. 1 and 2 (in that their followers 11 track the rails 8) but the lengthwise movement of links 12 is effected by the pusher 239 when the latter is moved to the raised position (jacks 243) and is thereupon compelled to move lengthwise in response to displacement of the channel 247 by the slide 246.

The drive of FIGS. 16 to 18 will be employed when the furnace is used for heat-treatment of very heavy workpieces. Since the pusher 239 engages several shafts 11A at a time, the tensional stresses upon the conveyor are distributed more evenly than if the links 12 were to receive motion from one of the wheels 15. The length of strokes of the pusher 239 is preferably such that the links 12 advance by steps whose length equals the distance between a pair of adjoining tooth spaces 10 whenever the pusher moves in one direction. The links 12 dwell when the pusher 239 performs strokes in the opposite direction. Of course, the pusher 239 moves downwardly and is disengaged from the shafts 11A before it begins a return stroke. The length of the pusher 239 may equal the length of the jacket 202.

It is clear that the ribs 241 of the beam 240 may engage with specially provided projections of the links 12, i.e., not necessarily with the shafts 11A. Also, the links 12 may be provided with female portions to receive male portions of the beam 240 when the latter is moved to raised position. Furthermore, the beam 240 may be provided with claws, jaws or like devices which engage the shafts 11A or complementary claws or jaws on the links 12 when the pusher 239 is raised. Thus, the pusher can be more or less positively coupled to the links 12 along the upper stringer of the conveyor before or while it performs a working stroke. Also, the pusher 239 can be arranged to push and/or pull the links 12 along the upper stringer. This pusher may be assembled of two or more rigidly or articulately connected sections or it may be replaced by two or more independent pushers.

Referring finally to FIGS. 19 and 20, there is shown a metallurgical furnace which comprises two or more endless conveyors having links 12, connecting plates 13, baffles 314 secured to or integral with the links 12, and jackets 302. When the pushers 339 are moved to their lower end positions, the baffles 14 come to rest on internal stop shoulders 352 provided in the compartments of the respective jackets 302. The manner in which the pushers 339 can be moved up and down as well as back and forth is the same as described in connection with FIGS. 13–15. In the embodiments of FIGS. 7–8, 13–15 and 19–20, the wheels for the endless conveyors need not be driven at all because the pushers 20, 139 and 339 can cause the links 12 to move up and down as well as lengthwise of the upper stringers.

The pusher 339 engages the baffles 314, i.e., it need not move into direct motion transmitting engagement with the links 12. The baffles 314 are disposed in a common plane (see FIG. 20) and their ends are overlapped by short auxiliary baffles 314A which intercept scale or other foreign matter in the regions between the adjoining links 12.

The pusher 339 is raised by lifting devices which are similar to those shown in FIGS. 12–15 with the exception that the rods 336 move up and down (arrow 336D) as well as forwards and backwards (arrow 336E). The rails can be omitted and the wheels at the end turns of the conveyor need not be driven because the rods 336 can impart to the pusher 339 reciprocatory movements in horizontal as well as in vertical directions. The hollow column 336B surrounding the rod 336 can be provided with a cooling system and serves to take up the weight of the central portion of the jacket 302. The column 336B is needed in connection with such rods 336 which extend through the lower part of the heating chamber. However, if the pusher 339 is to receive motion from rods which are mounted externally of the heating chamber, the columns 336B are not needed at all or may be replaced by columns which are without cooling means.

What is claimed as new and desired to be protected by Letters Patent is set forth in the appended claims.

I claim:

1. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links, said jacket means comprising a plurality of elongated stationary jackets extending substantially horizontally and substantially midway between the top and bottom regions of said heating chamber and said conveyor means including a separate endless conveyor for each of said jackets; and drive means including first displacing means for moving the links in said chamber between raised positions in which the links extend beyond said slot means and lift the workpieces above said jacket means and lower positions in which such links are retracted into said jacket means and the workpieces rest on said supporting means, and second displacing means for moving the links lengthwise whereby the links which are held in raised positions advance the workpieces.

2. A furnace as defined in claim 1, wherein each of said jackets has an internal compartment receiving a portion of the drive means for the respective conveyor and bounded by a housing of heat-insulating material, said slot means being in communication with said compartment.

3. A metallurgical furnace, comprising a heating chamber having an inlet and an outlet; endless conveyor means having at least one upper stringer extending through said chamber via said inlet and outlet and a lower stringer located without and at a level below said heating chamber, said conveyor means comprising a plurality of interconnected links arranged to transport metallic workpieces while moving along said upper stringer, said links being of rectangular outline and consisting of metallic sheet stock; cooling jacket means surrounding said upper stringer and having at the top thereof supporting means provided with slot means for said links; and drive means including first displacing means for moving the links in said chamber between raised positions in which the links extend beyond said slot means and lift the workpieces above said jacket means and lower positions in which such links are retracted into said jacket means and the workpieces rest on said supporting means, and second displacing means for moving the links lengthwise whereby the links which are held in raised positions advance the workpieces.

4. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links; drive means including first displacing means for moving the links in said chamber between raised positions in which the links extend beyond said slot means and lift the workpieces above said jacket means and lower positions in which such links are retracted into said jacket means and the workpieces rest on said supporting means, and second displacing means for moving the links lengthwise whereby the links which are held in raised positions advance the workpieces; and intercepting means carried by said links and located in said jacket means while the links advance along said upper stringer, said intercepting means being arranged to collect and to remove from said jacket means foreign matter which descends through said slot means.

5. A furnace as defined in claim 4, wherein said intercepting means comprises baffles provided at each side of each link.

6. A furnace as defined in claim 5, wherein the baffles of adjoining links overlap each other.

7. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links; drive means including first displacing means for moving the links in said chamber between raised positions in which the links extend beyond said slot means and lift the workpieces above said jacket means and lower positions in which such links are retracted into said jacket means and the workpieces rest on said supporting means, and second displacing means for moving the links lengthwise whereby the links which are held in raised positions advance the workpieces; and material removing means carried by said links to remove foreign matter from said slot means while the respective links advance along said upper stringer.

8. A furnace as defined in claim 7, wherein said material removing means comprises cutting devices secured to both sides of each link.

9. A furnace as defined in claim 7, wherein the material removing means of successive links are staggered transversely with reference to the direction of travel of links along said upper stringer so that each such material removing means removes material from a narrow portion of said slot means.

10. A furnace as defined in claim 7, wherein the distance between the material removing means of successive links is less than the distances covered by workpieces during travel with the links along said upper stringer.

11. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer, said links having portions consisting of heat-insulating material which engage the workpieces when the links along said upper stringer are raised; cooling jacket means surrounding said upper stringer and having at the top thereof supporting means provided with slot means for said links; and drive means including first displacing means for moving the links in said chamber between raised positions in which the links extend beyond said slot means and lift the workpieces above said jacket means and lower positions in which such links are retracted into said jacket means and the workpieces rest on said supporting means, and second displacing means for moving the links lengthwise whereby the links which are held in raised positions advance the workpieces.

12. A furnace as defined in claim 11, wherein said heat-insulating portions of links are armored with metallic sheet material.

13. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links, said supporting means consisting in part of heat-resistant material; and drive means including first displacing means for moving the links in said chamber between raised positions in which the links extend beyond said slot means and lift the workpieces above said jacket means and lower positions in which such links are retracted into said jacket means and the workpieces rest on said supporting means, and second displacing means for moving the links lengthwise whereby the links which are held in raised positions advance the workpieces.

14. A furnace as defined in claim 13, wherein said supporting means comprises a pair of elongated portions disposed at the opposite sides of said slot means and wherein at least one portion of said supporting means is provided with protuberances separated from each other by gaps.

15. A furnace as defined in claim 14, wherein each portion of said supporting means is provided with protuberances and wherein the protuberances of one of said portions register with gaps in the other portion.

16. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links; and drive means including first displacing means for moving the links in said chamber between raised positions in which the links extend beyond said slot means and lift the workpieces above said jacket means and lower positions in which such links are retracted into said jacket means and the workpieces rest on said supporting means, said first displacing means comprising follower means provided on said links and at least one rail provided in said jacket means, said rail having an uneven surface tracked by said follower means during travel of the respective links along said upper stringer, and second displacing means for moving the links lengthwise whereby the links which are held in raised positions advance the workpieces.

17. A furnace as defined in claim 16, wherein said follower means comprises at least one pair of rollers rotatably mounted on each of said links.

18. A furnace as defined in claim 16, wherein said follower means are equidistant from each other and wherein said rail comprises sections whose length equals the distance between said follower means, each section of said rail comprising a tooth and a tooth space and the dimensions of all said teeth being identical so that all of the workpieces are lifted and lowered simultaneously while the follower means track said rail.

19. A furnace as defined in claim 16, wherein said second displacing means comprises wheels and means for rotating at least one of said wheels, said links forming an endless chain which is trained around said wheels.

20. A furnace as defined in claim 16, wherein said follower means are equidistant from each other and wherein said rail comprises sections whose length equals the distance between said follower means, each such section including a tooth and a tooth space and the length of said teeth and tooth spaces varying from section to section.

21. A furnace as defined in claim 20, wherien the length of said teeth in successive sections of said rails increases in the direction of travel of links along said upper stringer.

22. A furnace as defined in claim 16, wherein said second displacing means comprises pusher means, means for moving said pusher means into and from engagement with at least one link along said upper stringer, and means for moving said pusher means lengthwise of said upper stringer whereby the pusher means advances said follower means along said rail.

23. A furnace as defined in claim 22, wherein said pusher means is movable between upper and lower end positions to respectively engage and release said one link, said one link and said pusher means having mating portions which engage with each other in the upper end position of said pusher means.

24. A furnace as defined in claim 23, wherein said pusher means is movable lengthwise of said upper stringer in one direction in said upper end position thereof to advance said links, and in opposite direction in the lower end position thereof to reassume a starting position independently of said links.

25. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links; and drive means including first displacing means for moving the links in said chamber between raised positions in which the links extend beyond said slot means and lift the workpieces above said jacket means and lower positions in which such links are retracted into said jacket means and the workpieces rest on said supporting means, said first displacing means comprising following means provided on said links and lifting means having a portion movable up and down in said jacket means to respectively raise and lower the links along said upper stringer, and second displacing means for moving the links lengthwise whereby the links which are held in raised positions advance the workpieces, said second displacing means comprising wheels and means for rotating at least one of said wheels, said links forming an endless chain which is trained around said wheels.

26. A furnace as defined in claim 25, wherein said lifting means comprises vertically movable rods extending downwardly from said jacket means and said portion of said lifting means comprising a rail affixed to said rods.

27. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links, each of said links being provided with intercepting means for collecting foreign matter which descends through said slot means and said jacket means comprising internal stop means supporting said intercepting means in the lower positions of said links; and drive means including first displacing means for moving the links in said chamber between raised positions in which the links extend beyond said slot means and lift the workpieces above said jacket means and lower positions in which such links are retracted into said jacket means and the workpieces rest on said supporting means, said first displacing means comprising lifting means for intermittently lifting said intercepting means above and away from said stop means, and second displacing means for moving the links lengthwise whereby the links which are held in raised positions advance the workpieces.

28. A furnace as defined in claim 27, wherein said lifting means comprises pusher means engaging with the links along said upper stringer and means for raising and lowering said pusher means, said second displacing means comprising means for moving said pusher means back and forth in the longitudinal direction of said upper stringer.

29. A furnace as defined in claim 27, wherein said stop means comprises internal shoulders provided in said jacket means.

30. A metallurgical furnace, comprising a heating chamber having an inlet and an outlet; endless conveyor means having at least one upper stringer extending through said chamber via said inlet and outlet, said conveyor means comprising a plurality of interconnected links arranged to transport metallic workpieces while moving along said upper stringer; cooling jacket means surrounding said upper stringer and having at the top thereof supporting means provided with slot means for said links; and drive means including first displacing means for moving the links in said chamber between raised positions in which the links extend beyond said slot means and lift the workpieces above said jacket means and lower positions in which such links are retracted into said jacket means and the workpieces rest on said supporting means said first displacing means comprising vertically reciprocable members extending downwardly from and beyond said jacket means, and second displacing means for moving the links lengthwise whereby the links which are held in raised positions advance the workpieces.

31. A furnace as defined in claim 30, wherein at least one of said vertically reciprocable members extends through said heating chamber at a level below said jacket means.

32. A furnace as defined in claim 31, further comprising a heat-insulating column surrounding said one vertically reciprocable member in said heating chamber.

33. A furnace as defined in claim 32, wherein said column receives said one vertically reciprocable member with freedom of reciprocatory movement in the longitudinal direction of said jacket means.

References Cited

UNITED STATES PATENTS

| | | | |
|---|---|---|---|
| 1,205,503 | 11/1916 | Barnhart et al. | 263—8 |
| 1,878,896 | 9/1932 | Sessions | 263—8 |

JOHN J. CAMBY, *Primary Examiner.*

U.S. Cl. X.R.

287—20.92; 292—241, 340